United States Patent
Hossain et al.

(10) Patent No.: US 9,989,393 B2
(45) Date of Patent: Jun. 5, 2018

(54) SYSTEM AND METHOD FOR MONITORING MASS FLOW STABILITY AT VARIABLE AIR FLOW RATES IN AN AIR SEEDER

(71) Applicant: CNH Industrial Canada, Ltd., Saskatoon (CA)

(72) Inventors: Mohammad Shabbir Hossain, Chittagong (BD); Scott D. Noble, Saskatoon (CA); David Sumner, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 233 days.

(21) Appl. No.: 14/969,806

(22) Filed: Dec. 15, 2015

(65) Prior Publication Data
US 2016/0169724 A1    Jun. 16, 2016

Related U.S. Application Data

(60) Provisional application No. 62/092,533, filed on Dec. 16, 2014.

(51) Int. Cl.
*G01F 1/88* (2006.01)
*A01C 7/10* (2006.01)
(Continued)

(52) U.S. Cl.
CPC ............... *G01F 1/88* (2013.01); *A01C 7/102* (2013.01); *A01C 7/107* (2013.01); *G01F 1/34* (2013.01);
(Continued)

(58) Field of Classification Search
CPC ... A01C 7/102; G01F 1/76; G01F 1/74; G01F 1/34; G01F 25/0053
(Continued)

(56) References Cited

U.S. PATENT DOCUMENTS

| 8,746,158 B2 * | 6/2014 | Binsirawanich | .......... G01F 1/74 111/174 |
| 2004/0154383 A1 * | 8/2004 | Woolf | ..................... G01F 1/383 73/53.01 |

(Continued)

*Primary Examiner* — Bo Fan
(74) *Attorney, Agent, or Firm* — Rebecca L. Henkel; Rickard K. DeMille

(57) ABSTRACT

A method of monitoring a mass flow rate of product being applied with an agricultural implement includes the steps of:
calibrating a pressure drop across a known distance in an air line at a number of air flow rates;
metering a product at a desired application rate into the air line at a selected one of the air flow rates;
establishing a pressure drop across the known distance at the selected air flow rate, while the product is being metered at the desired application rate;
calculating a value of $K_1$ dependent on the established pressure drop;
estimating a mass flow rate of the product being applied, using the mathematical expression:

Figure 1:
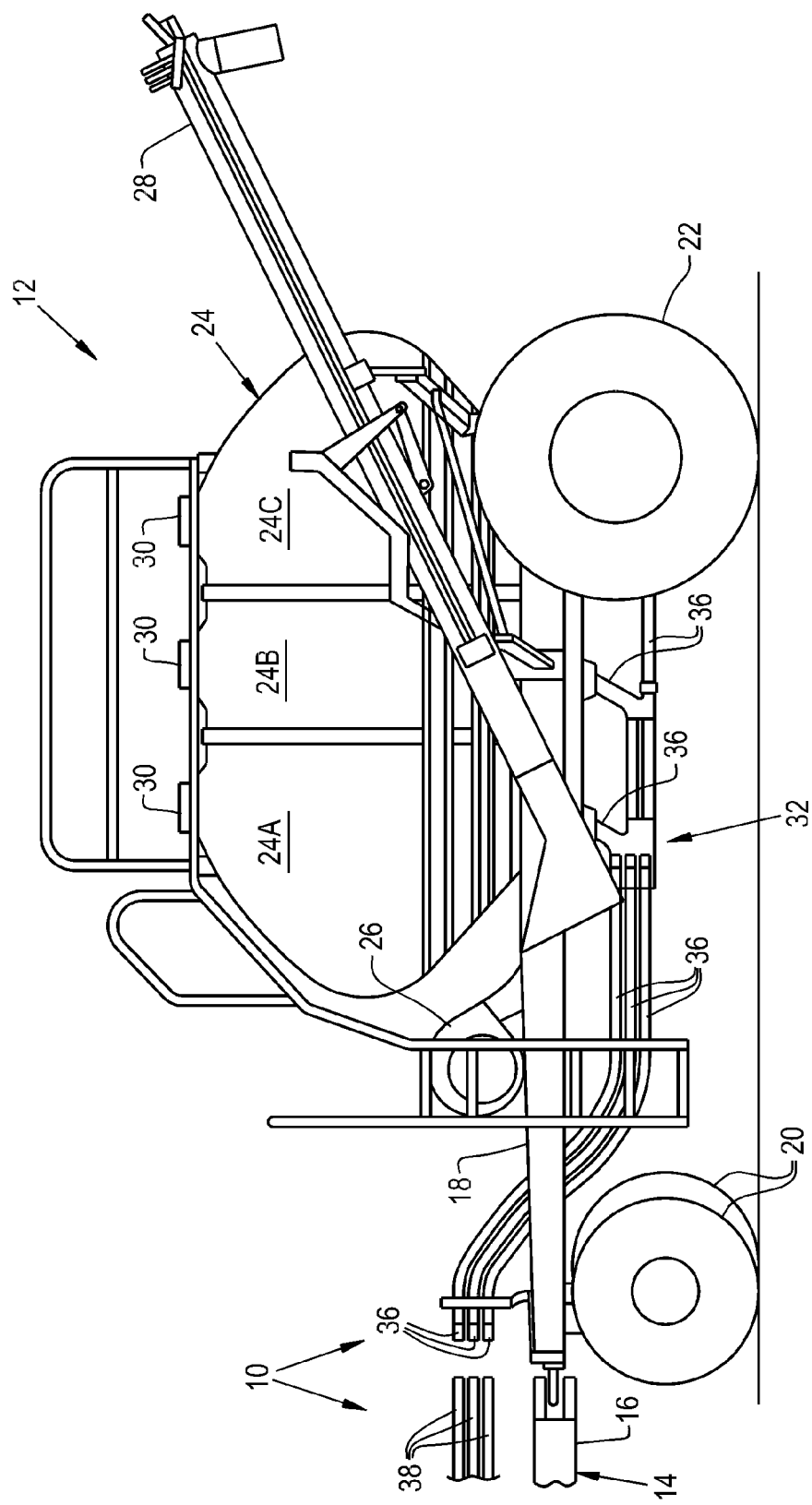

$$\log \mu = -(1+\epsilon) \cdot \log Fr + K_1$$

where
$\mu$ (mass loading ratio);
Fr (Froude number);
$\epsilon$ = calibration variable; and
$K_1$ = constant for a given product being applied at a given mass flow rate.

20 Claims, 4 Drawing Sheets

(51) Int. Cl.
*G01F 25/00* (2006.01)
*G01F 1/34* (2006.01)
*G01F 1/76* (2006.01)
*A01C 7/08* (2006.01)

(52) U.S. Cl.
CPC ............ *G01F 1/76* (2013.01); *G01F 25/0007* (2013.01); *G01F 25/0053* (2013.01); *A01C 7/081* (2013.01); *Y02P 60/16* (2015.11)

(58) Field of Classification Search
USPC ......................................................... 702/47
See application file for complete search history.

(56) References Cited

U.S. PATENT DOCUMENTS

| | | | | |
|---|---|---|---|---|
| 2008/0053240 | A1* | 3/2008 | Henry | G01F 1/74 73/861.04 |
| 2014/0305184 | A1* | 10/2014 | Moore | G01F 1/699 73/1.16 |
| 2015/0268078 | A1* | 9/2015 | Zhang | G01F 1/6884 374/45 |
| 2016/0169724 | A1* | 6/2016 | Hossain | G01F 1/88 702/47 |

* cited by examiner

SYSTEM AND METHOD FOR MONITORING MASS FLOW STABILITY AT VARIABLE AIR FLOW RATES IN AN AIR SEEDER

CROSS REFERENCE TO RELATED APPLICATIONS

This is a non-provisional application based upon U.S. provisional patent application Ser. No. 62/092,533, entitled "SYSTEM AND METHOD FOR MONITORING MASS FLOW STABILITY AT VARIABLE AIR FLOW RATES IN AN AIR SEEDER", filed Dec. 16, 2014, which is incorporated herein by reference.

BACKGROUND OF THE INVENTION

1. Field of the Invention

The present invention relates to a system and method for monitoring product flow in an agricultural implement, and, more particularly, to such a system and method used with an agricultural seeding implement.

2. Description of the Related Art

Generally, seeding implements are towed behind a tractor or other work vehicle via a hitch assembly secured to a rigid frame of a planter or seeder. These seeding implements typically include one or more ground engaging tools or openers that form a seed trench for seed deposition into the soil. The openers are used to break the soil to enable seed deposition. After the seeds are deposited, each opener is followed by a packer wheel that packs the soil on top of the deposited seeds.

Air seeders are commonly towed by a traction unit, e.g., an agricultural tractor, to apply a material such as seed, fertilizer and/or herbicide to a field. An air seeder has as a primary component a wheeled air cart which includes one or more frame-mounted tanks for holding material. In the case of multiple tanks, the tanks can be separate tanks, or a single tank with internal compartments. The air cart is typically towed in combination with a tilling implement, such as an air drill, one behind the other, to place the seed and fertilizer under the surface of the soil. Air seeders generally include a metering system for dispensing material from the tanks and a pneumatic distribution system for delivering the material from the tanks to the soil. A centrifugal fan provides at least one airstream which flows through the pneumatic distribution system. Material is first introduced to the air stream by the metering system at a primary distribution manifold located below the metering system. The tanks of the air seeders are formed with bottom surfaces that slope downward at an angle of repose for the granular material toward the metering system. Gravity, in combination with the vibrations and movement of the air seeder, act to move the granular material from the perimeter of the tank toward the metering system located at the center of the tank. Material is carried by the air stream through distribution lines to a series of secondary distribution manifolds, which in turn distribute the material through distribution lines to seed boots mounted behind ground openers on the tilling implement so that the product may be evenly delivered to the ground which is tilled by the tilling implement.

To ensure that a desired quantity of product is delivered, a calibration procedure may be performed to calibrate rotation of meter rollers within the metering system to a mass flow rate of product to the openers. Some calibration procedures involve user intervention throughout the process. For example, a user may attach a bag to the metering system to collect expelled product. The user may then instruct the metering system to rotate the meter rollers through a desired number of rotations (e.g., 50 100, 150, 200, etc.). Next, the user may weigh the collected product and enter the weight into a user interface. A controller may then automatically compute a calibration that associates product mass flow rate with rotation of the meter rollers. Such user intervention may be time consuming, and may result in inaccurate calibrations, thereby causing too much or too little product to be delivered.

Current product delivery systems assume that the meter roller has been properly calibrated and remains operating properly throughout usage. Air seeders currently do not provide feedback on the product mass flow rate of the product being conveyed. With a technology shift toward variable-rate and independent control of product flow rates, knowledge of the actual flow within the air seeder will be important to properly controlling the air delivery system. Existing methods for pressure-based mass flow rate determination are either purely empirical, or rely on the flow being fully accelerated and the air velocity being well above a minimum conveying velocity of the product being conveyed. Neither of these conditions are amenable to application on an air cart/drill.

For example, U.S. Pat. No. 8,746,158 (which is assigned to the assignee of the present invention) discloses a pressure based mass flow rate system and method using empirical data. A controller receives pressure sensor signals to determine a pressure drop across a known length of pipe, and compares the pressure drop with data from an empirical pressure database.

Notwithstanding the trend toward variable rate application of product being applied to a field, there are still many instances where product is applied to a field at an assumed constant application rate. Since the air flow rate and product flow rate are independent from each other, there are also conditions under which it may be desirable to maintain a substantially constant product application rate while varying the air flow rate. For example, the conveying air may be conveyed with a variable air flow rate to minimize usage of air, even though the mass flow rate of the product may remain substantially constant. Having an indication that the mass flow rate of the product being applied is incorrect under variable air flow rates may be a useful feedback mechanism; particularly if the mass flow rate of the product is assumed to remain substantially constant. However, current models do not allow such feedback during operation of an air seeder.

What is needed in the art is a faster and more accurate system and method for monitoring the mass flow rate of a product being conveyed in an air seeder, particularly under an assumed substantially constant product application rate.

SUMMARY OF THE INVENTION

The present invention provides a product measurement system and method for use in an air seeder which provides feedback concerning the actual mass flow rate of the product being applied under variable air flow conditions.

The invention in one form is directed to a method of monitoring a mass flow rate of product being applied with an agricultural implement, including the steps of:

providing an air flow from a pressure source at a known air flow rate in an air line;

determining a pressure drop in the air line along a known distance in a downstream direction using at least one pressure sensor, each pressure sensor being positioned downstream from the pressure source;

repeating the providing and determining steps at a plurality of known air flow rates;

metering a product at a desired application rate into the air line at a selected one of the air flow rates;

establishing a pressure drop across the known distance at the selected air flow rate, while the product is being metered at the desired application rate;

calculating a value of $K_1$ dependent on the established pressure drop;

estimating a mass flow rate of the product being applied, using the mathematical expression:

$$\log \mu = -(1+\epsilon) \cdot \log Fr + K_1$$

where $\mu$ (mass loading ratio)=ratio of pressure drop per unit length of air line for a solid-air mixture to pressure drop per unit length of air line for air only;

Fr (Froude number)=ratio of inertial force and gravitational force;

$\epsilon$=calibration variable; and $K_1$=constant for a given product being applied at a given mass flow rate.

The invention in another form is directed to a mass flow measurement system for monitoring a mass flow rate of product being applied with an agricultural implement. The mass flow measurement system includes:

a pressure source in communication with an air line;

an air flow sensor in communication with the air line, the air flow sensor being positioned downstream from the pressure source;

a metering device in communication with the air line, the metering device being positioned downstream from the air flow sensor;

at least one pressure sensor in communication with the air line, each pressure sensor being positioned downstream from the metering device; and a controller coupled with each of the pressure source, the air flow sensor, the metering device, and the at least one pressure sensor. The controller is configured for:

providing an air flow from a pressure source at a known air flow rate in an air line;

determining a pressure drop in the air line along a known distance in a downstream direction using at least one pressure sensor, each pressure sensor being positioned downstream from the pressure source;

repeating the providing and determining steps at a plurality of known air flow rates;

metering a product at a desired application rate into the air line at a selected one of the air flow rates;

establishing a pressure drop across the known distance at the selected air flow rate, while the product is being metered at the desired application rate;

calculating a value of $K_1$ dependent on the established pressure drop;

estimating a mass flow rate of the product being applied, using the mathematical expression:

$$\log \mu = -(1+\epsilon)\cdot\log Fr + K_1.$$

An advantage of the present invention is that the method verifies that product is actually being metered into the air line at a desired application rate, even if the air flow rate (and thus pressure) is varying.

Another advantage of the present invention is that the mass flow rate can be estimated in areas of undeveloped air flow, without requiring long, straight runs.

Another advantage is that the system should be easer to calibrate, having fewer coefficients to solve for and simpler mathematical relationships. Thus, fewer data points are needed to calibrate.

Yet another advantage is that the one or more sensors can be factory calibrated, and only need a validation/correction in the field.

Yet a further advantage is that it is feasible to develop correlations for the model coefficients based on particle characteristics, further simplifying the calibration process.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a partial, side schematic illustration of an embodiment of an air seeder which can be used with the system and method of the present invention;

FIG. 2 is a schematic illustration of an embodiment of a product flow measurement system of the present invention;

FIG. 3 is a graph illustrating a log-log plot of mass loading ratio vs. Froude number for wheat;

FIG. 4 is a graph illustrating a plot of $K_1$ vs. specific pressure drop for wheat at an air velocity of 20 m/s; and FIG. 5 is a flow chart illustrating an embodiment of a method of monitoring a mass flow rate of product being applied in an agricultural air seeder.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Referring now to the drawings, and more particularly to FIG. 1, there is shown a partial, side schematic illustration of an embodiment of an agricultural implement in the form of an air seeder 10 of the present invention. Air seeder 10 generally includes an air cart 12 which is towed by a tilling implement 14 (with only a portion of the rear hitch 16 of tilling implement 14 showing in FIG. 1). In the embodiment shown, tilling implement 14 is in the form of an air drill, but can be differently configured, depending upon the application. For example, tilling implement 14 could be in the form of a planter and air cart 12 could be used to refill mini-hoppers onboard the planter. Air cart 12 may also be configured with a rear hitch (not shown) allowing air cart 12 to be towed in front of, rather than behind, tilling implement 14.

Air cart 12 generally includes a frame 18 which carries steerable front wheels 20, rear wheels 22, tank 24, an air source in the form of a blower 26, and an auger 28. Tank 24 is illustrated as a multi-compartment tank with internal divider walls (not shown) separating the compartments. In the embodiment shown, tank 24 has three compartments 24A, 24B and 24C with each compartment containing a material to be deposited into the soil (such as seed, fertilizer, herbicide and/or insecticide). Each compartment 24A, 24B and 24C has a top hatch 30 allowing loading of the material therein.

Air cart 12 includes a product delivery system in the form of a pneumatic distribution system 32 for delivering the air-entrained material to the trenches in the soil formed by tilling implement 14. Pneumatic distribution system 32 includes a metering system 34 (not specifically shown in FIG. 1, but illustrated in FIG. 2 discussed below), blower 26 and a plurality of air lines 36. Air lines 36 extend forward to and terminate at a convenient location for coupling with air lines 38 associated with tilling implement 14.

In the illustrated embodiment, blower 26 is a centrifugal blower, but can be differently configured. Further, in the illustrated embodiment, three primary air lines 36 are shown, one from each tank compartment 24A, 24B and 24C. However, the number of air lines 36 can vary, depending on the application.

Figure 2:
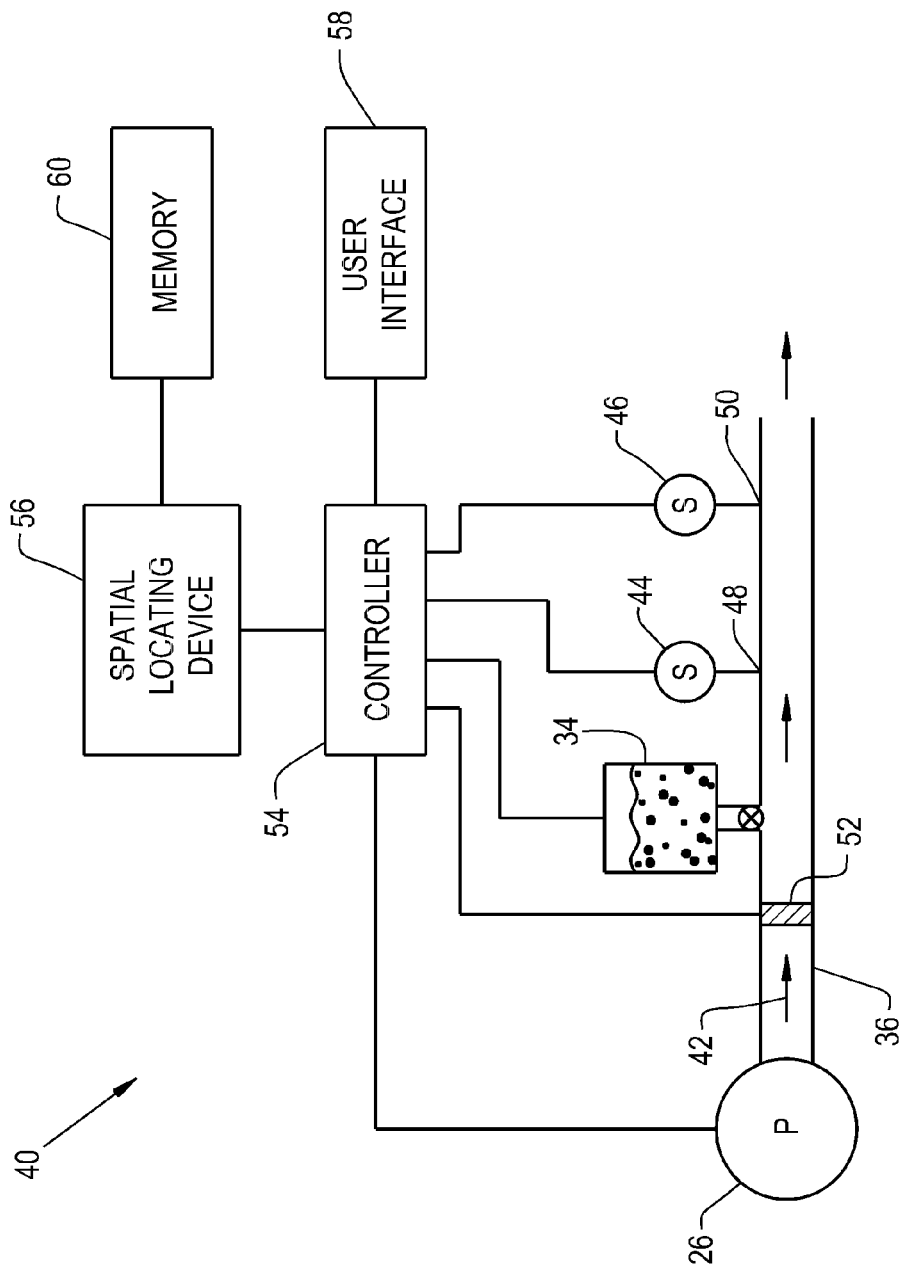

Referring now to FIG. 2, the air seeder 10 shown in FIG. 1 may include a product flow measurement system 40 for measuring product flow delivered to the trenches formed in the soil. In the illustrated embodiment, the product flow measurement system 40 includes an air source in the form of blower 26 which is configured to provide an air flow 42 into the air lines 36. The metering device 34 is configured to deliver product into the air flow 42, thereby establishing a product/air mixture that flows in a downstream direction toward the implement 14. In the illustrated embodiment, the product flow measurement system 40 is configured to determine a mass flow rate of product through the air lines 36. As illustrated, the product flow measurement system 40 may include a first pressure sensor 44 configured to measure fluid pressure within an upstream portion of the air line 36, and a second pressure sensor 46 spaced from first pressure sensor 44 at a known distance and configured to measure fluid pressure within a downstream portion of the air line 36. The first pressure sensor 44 is fluidly coupled to the air line 36 via a first pressure tap 48, and the second pressure sensor 46 is fluidly coupled to the air line 36 via a second pressure tap 50. The sensors 44 and 46 are configured to measure the fluid pressure within the conduit 38 via the respective pressure taps 48 and 50, and to output respective signals indicative of the measured pressure. As will be appreciated, the first and sensor pressure sensors may include fiber optic sensors, mechanical deflection sensors, piezoelectric sensors, microelectromechanical system (MEMS) sensors, or any other suitable sensor configured to output a signal indicative of fluid pressure within the air line 36.

The product flow measurement system 40 also includes an air flow sensor 52 positioned upstream from the metering device 34. The air flow sensor 52 is configured to measure a flow rate of the air flow 42, and a velocity of the air flow 42. In certain embodiments, the air flow sensor 52 can include an orifice plate having an aperture with a smaller diameter than the air line 36. As the air flow 42 passes through the aperture, the fluid pressure decreases and the velocity increases. By measuring the pressure difference between the air flow upstream and downstream of the aperture, the flow rate (e.g., volumetric flow rate, mass flow rate, etc.) of air flow 42 may be determined. In other embodiments, the air flow sensor 52 can include a hot wire sensor having an electrically heated element extending through the air flow. As will be appreciated, heat transfer from the wire to the air flow is at least partially dependent on the flow rate of the air flow across the wire. Therefore, by measuring the electrical current sufficient to heat the wire to a desired temperature, the flow rate of air flow 42 may be determined. It should also be appreciated that alternative embodiments may include other suitable air flow sensors configured to measure flow rate and/or velocity of the air flow 40. As will be appreciated, if a volumetric flow rate is measured, the mass flow rate may be calculated based on the density of the air.

In the illustrated embodiment, the first pressure sensor 44, the second pressure sensor 46 and the air flow sensor 52 are communicatively coupled to a controller 54. The controller 54 can be variously configured, such as a digital controller, analog controller, or a combination of the two, etc. The controller 54 is configured to receive a first signal from the first pressure sensor 44 indicative of fluid pressure within the upstream portion of the air line 36, and to receive a second signal from the second pressure sensor 46 indicative of fluid pressure within the downstream portion of the air line 36. The controller 54 is also configured to receive a third signal from the air flow sensor 52 indicative of a flow rate of air flow 42, and may receive a fourth signal from the air flow sensor 52 indicative of a velocity of the air flow. Alternatively, the controller 54 may be configured to receive the third signal or the fourth signal, and to determine both the mass flow rate of the air flow and/or the velocity of the air flow based on the single signal. Once the signals have been received, the controller 54 may determine a pressure drop between the upstream and downstream portions of the air line 36 based on the first and second signals. The controller 54 may then determine a mass flow rate of product through the fluid conduit based on the pressure drop, the mass flow rate of the air flow and the velocity of the air flow.

While the illustrated embodiment includes separate pressure sensors 44 and 46, it should be appreciated that alternative embodiments may include a single pressure sensor configured to directly measure the pressure drop between the upstream and downstream portions of the air line 36. For example, in certain embodiments, a differential pressure sensor may be fluidly coupled to the first pressure tap 48, and to the second pressure tap 50. In such embodiments, the differential pressure sensor may be configured to output a signal indicative of the pressure difference (i.e., pressure drop) between the upstream portion of the air line 36 and the downstream portion of the air line 36. Accordingly, the controller 54 may determine the product mass flow rate based on the differential pressure signal.

For precision farming applications, a spatial locating device 56 (e.g., GPS unit) can be used to provide spatial data to the controller 54 indicative of a geo-spatial location of the air seeder within a field. The spatial data can be matched with data from soil charts, application rates, etc. for the field to carry out variable application seeding with the air seeder 10.

A user interface 58 allows an operator to enter various input data into the controller 54 for operation of the air seeder 10. For example, the user could enter a particular type of material to be applied, whether the operator wishes to use constant or variable rate application, etc. The user interface can be any suitable type of interface, such as a touch screen, keyboard, etc.

As indicated above, known models for determining a mass flow rate of the product being dispensed assume that the metering device works properly after being calibrated, and also assume that the product is fully suspended in the air stream, each of which may be faulty assumptions. There is no way to know if the product mass flow rate changes outside of acceptable limits. Further, known models may also calculate for the pressure drop factor for solids ($\Delta_Z$) in a simplified form by neglecting the effect of gravity. That assumption can be made when the particles have travelled far enough to be considered fully suspended. But when the pressure drop measurement comes within the first meter or so, neglecting gravitational effect may not be a valid assumption, especially, for lower superficial air velocities.

According to an aspect of the present invention, feedback is provided to the controller 54 to determine if the dispense rate of the metering device falls outside of acceptable limits, and the effects of gravity in non-developed areas of flow are included in the model. To that end, a complete representation of the pressure drop factor for solids ($\Delta_Z$), including the effects of gravity in areas of flow which are not fully developed, is shown in Equation [1], $$\lambda_Z = \lambda_Z^* \frac{c}{v} + \frac{2\beta}{\frac{c}{v} Fr^2}, \quad [1]$$

where $\lambda_Z^*$ is the impact and friction factor for solids [dimensionless], c is the particle velocity [m/s], v is the superficial air velocity [m/s], ft is the velocity ratio related to particle fall velocity in a cloud [dimensionless], and Fr is the Froude number [dimensionless].

The Froude number (Fr) in Equation [1] is the ratio of inertial force and gravitational force, whereas β is the ratio of particle fall velocity due to gravity and superficial air velocity. With the representation of pressure drop according to Equation [1], the expression for specific pressure drop a takes the form:

$$\alpha = 1 + \left( \frac{\lambda_Z^* \frac{c}{v} + \frac{2\beta}{\frac{c}{v} Fr^2}}{\lambda_L} \right) \mu. \qquad [2]$$

The term specific pressure drop (α, dimensionless) is the ratio of the pressure drop per unit length of solid-air mixture to pressure drop per unit length of air only. The term mass loading ratio or mass flow ratio (μ, dimensionless) is a convenient way to identify dilute or dense phase flow. The mass flow ratio is the ratio of mass flow rate of solids entrained in air to the mass flow rate of air only. In separate experiments, the relationship between mass loading ratio (μ) and Froude number (Fr) at the pressure minimum condition have been determined. Experiments have been conducted with Polystyrol (diameter 1 mm-2.5 mm) inside carbon steel pipe. The developed relationship was valid for pipe diameters of 50 mm-400 mm. It is given by:

$$\mu = KFr_4, \qquad [3]$$

where K is an experimental constant [dimensionless].

Assuming Equation [3] is valid for this disclosure as well, putting $$Fr^2 = \sqrt{\frac{\mu}{K}}$$

in Equation [2] gives the expression for specific pressure drop as:

$$\alpha = 1 + \left( \frac{\lambda_Z^*}{\lambda_L} \right) \left( \frac{c}{v} \right) \mu + \frac{2\beta\sqrt{K}}{\left( \frac{c}{v} \right) \lambda_L} \sqrt{\mu}. \qquad [4]$$

Letting $$A = \left( \frac{\lambda_Z^*}{\lambda_L} \right) \left( \frac{c}{v} \right), \qquad [5]$$

and $$B = \frac{2\beta\sqrt{K}}{\left( \frac{c}{v} \right) \lambda_L}, \qquad [6]$$

equation [4] then takes the form:

$$\alpha = 1 + A\mu + B\sqrt{\mu}. \qquad [7]$$

Equation [7] has both linear and non-linear components. If the value of B is smaller compared to the value of A, the specific pressure drop vs. mass loading ratio should be linear. If gravitational effects become significant at lower velocities, the plot will become non-linear because the value of B in that case will not be negligible. The experimental plots obtained when pressure drop was measured in between 0.3 m and 0.9 m of the test section, were also linear for higher velocities and nonlinear for lower velocities. To see whether Equation [7] can represent both the linear and nonlinear trends observed in the experiments, it was optimized to determine the values of unknown parameters A and B at each air velocity being considered.

Optimization of the parameters A and B was carried out by using the MATLAB engineering analysis software and an appropriate algorithm. The selected algorithm is best suited for non-linear optimization. Table 1 lists the value of parameters A and B for different air velocities, and a selected product type (the values of A and B vary, depending on product/particle type (e.g., wheat, corn, granular herbicide, granular fertilizer, etc.)).

TABLE 1

Values of parameters A and B at different air velocities

| Air Velocity (m/s) | Value of A | Value of B |
|---|---|---|
| 30 | 1.7818 | −0.1287 |
| 28 | 1.6573 | 0.1784 |
| 26 | 1.6494 | 0.2547 |
| 24 | 1.387 | 0.4825 |
| 22 | 1.0593 | 0.7139 |
| 20 | 0.5058 | 1.1983 |
| 18 | 0.2056 | 1.5464 |
| 16 | −0.2585 | 2.0845 |
| 14 | −0.4723 | 2.2856 |
| 13 | −0.1951 | 1.965 |

It can be seen from the table that the value of A dominates at higher velocities. As the air velocity decreases, the value of B starts to dominate. All of these optimizations had an R-Square value greater than 0.99. Equations [5] and [6] suggest that parameters A and B are ratios of positive dimensionless numbers and velocity magnitudes. Hence they cannot have negative values. For this reason optimized values of A and B were adjusted with the curve fitting tool of the MATLAB software. The adjusted values of A and B (with 95% confidence interval) are presented in Table 2 along with the R-Square values.

TABLE 2

Adjusted values of Parameter A and B at different air velocities

| Air Velocity (m/s) | Value of A | Value of B | R-Square |
| --- | --- | --- | --- |
| 30 | 1.65 | 0.05 | 0.9923 |
| 29 | 1.65 | 0.15 | 0.9977 |
| 28 | 1.65 | 0.20 | 0.9977 |
| 27 | 1.65 | 0.25 | 0.9850 |
| 26 | 1.65 | 0.30 | 0.9953 |
| 25 | 1.48 | 0.40 | 0.9966 |
| 24 | 1.39 | 0.48 | 0.9962 |
| 23 | 1.25 | 0.53 | 0.9951 |
| 22 | 1.06 | 0.71 | 0.9969 |
| 21 | 0.95 | 0.79 | 0.9919 |
| 20 | 0.75 | 0.93 | 0.9842 |
| 19 | 0.65 | 1.03 | 0.9857 |
| 18 | 0.48 | 1.23 | 0.9840 |
| 17 | 0.23 | 1.37 | 0.9804 |
| 16 | 0.15 | 1.61 | 0.9747 |
| 15 | 0.001 | 1.72 | 0.9703 |

The value of parameter A remains constant at higher velocities and gradually decreases with air velocity. This indicates that even when pressure drop is measured closer to the metering device 34, the majority of the particles are fully accelerated at higher velocities. For this reason the value of A remains substantially constant. But due to the presence of parameter B (i.e., due to some particles not attaining full acceleration), the overall value of the slope was different at higher velocities. Below 15 m/s the value of A becomes negative. Therefore, based on the MATLAB analysis, the model presented in Equation [7] is valid for air velocities from 15 m/s-30 m/s.

The model presented in Equation [7] is based on the assumption that the relationship between the Froude number and mass loading ratio is valid for other conveyed products as well (e.g., wheat). That relationship was obtained at the minimum pressure condition by plotting mass loading ratio vs. Froude number, also known as the dimensionless state diagram. Two unique properties of the dimensionless state diagram of mass loading ratio vs. Froude number makes it very suitable for developing a model to calculate mass flow rate. These properties include:

1. For every mass flow rate of a solid, the log-log plot of mass loading ratio vs. Froude number will be a straight line; and
2. All of these straight lines will be parallel to each other.

Figure 3:
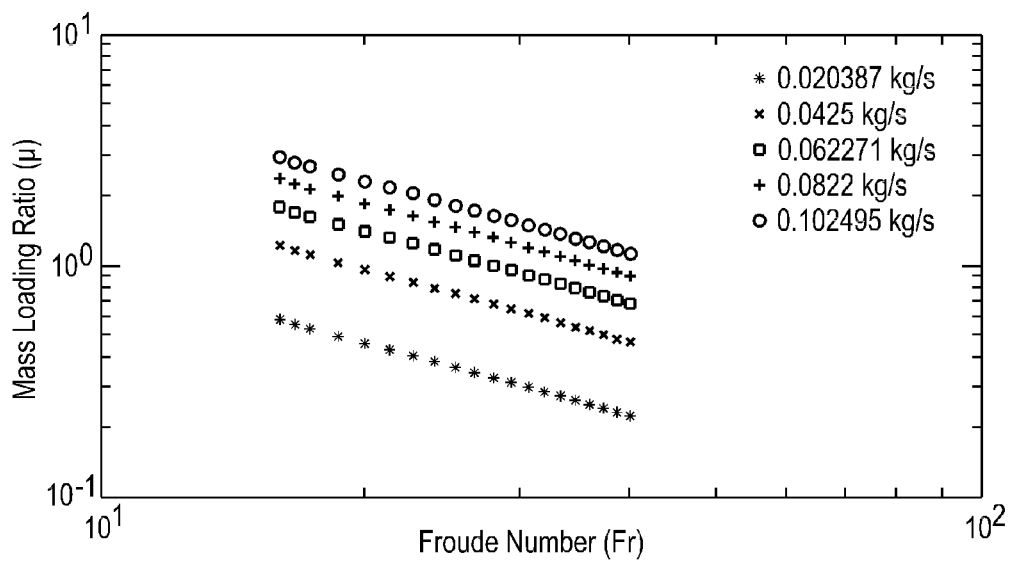

A log-log plot of mass loading ratio vs. Froude number from experimental data is shown in FIG. 3. In the example shown in FIG. 3, the conveyed product is wheat, and the pipe diameter is 0.0573 m. The relationship shown in FIG. 3 can be expressed with the mathematical equation:

$$\log \mu = -(1+\epsilon)\log Fr + K_1 \quad [8]$$

The Froude number in equation [8] can be calculated using the expression:

$$Fr = \frac{v}{\sqrt{gD}}, \quad [9]$$

where v is the superficial air velocity [m/s],
g is the acceleration due to gravity [m/s$^2$], and
D is the pipe diameter [m].

The variable $\epsilon$ is actually a calibration variable which varies based on local conditions, measurement uncertainty, sensor bias, etc. and has an ideal value of zero (0). The calibration variable $\epsilon$ can vary +/−0.1, with the coefficient in front of the log term thus ranging between 0.9 to 1.1. In the example shown, the calibration variable E has the specific value of 0.0419, making the coefficient in front of the log term 1.0419.

The parameter $K_1$ has a constant value for each product mass flow rate and its value increases with the increment of mass flow rate as the straight line shifts upwards. Since the value of $K_1$ is only dependent on solids mass flow rate, the temptation would be to develop a relationship between $K_1$ and solids mass flow rate. In that case, Equation [8] will have the same value of solids mass flow rate on both sides and it will be eliminated from the Equation. Probably for this reason, a Mass loading ratio vs. Froude number relationship has not been used in any previous investigations to calculate solids flow rate. But, if an indirect relationship is established between $K_1$ and solids mass flow rate, Equation [8] can be solved for the mass flow rate of solids. That is, not developing a direct relationship between $K_1$ and solids mass flow rate, but between $K_1$ and other quantities that are also dependent on solids mass flow rate. Pressure drop is one such quantity.

From FIG. 3, it is evident that for the same Froude number, there exists infinite mass loading ratios. On the other hand, the same mass loading ratio can occur at different Froude numbers. It is therefore necessary to locate the intercept (i.e. the value of $K_1$) of Equation [8]. At the same air velocity, the pressure drop is different for different solids mass flow rates. Since the pipe diameter and gravitational acceleration are constant, it can be said that pressure drop is different for different solids mass flow rates at the same Froude number. Hence developing a relationship between $K_1$ and pressure drop will make Equation [8] solvable for the mass loading ratio. The question still remains at which air velocity this relationship should be developed? A unique feature of FIG. 3 has the answer to this question. Since the value of $K_1$ does not change with air velocity once its value is determined, the relationship could be developed at any air velocity within the operating range. The system just needs to be operated at that air velocity before the actual operation in the field to determine the value of $K_1$. Once $K_1$ is determined, Equation [8] can be used to determine the mass loading ratio at any air velocity. Every time the mass flow rate of solids is changed, the system first needs to run at that particular air velocity or velocities where calibration equations between $K_1$ and pressure drop are available.

Figure 4:
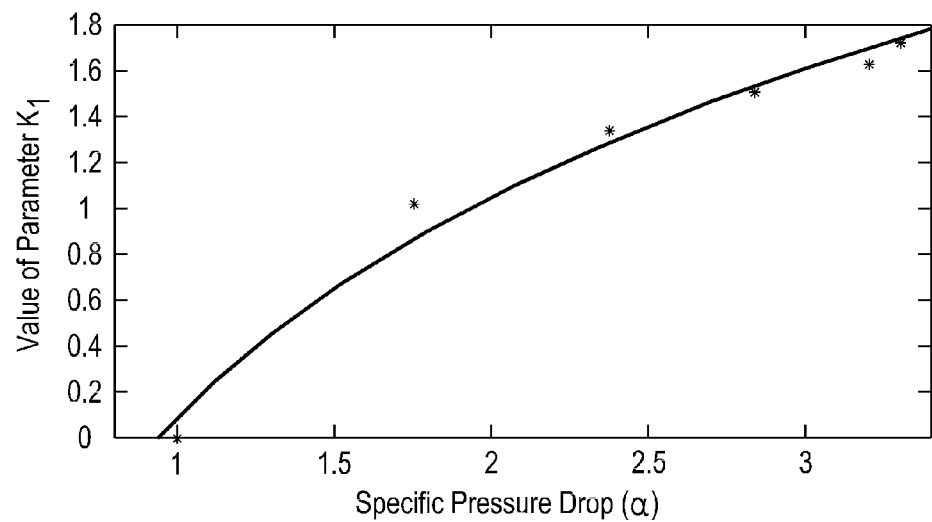

To explain this concept, a plot of $K_1$ vs. specific pressure drop for wheat at an air velocity of 20 m/s is shown in FIG. 4. Specific pressure drop was used to make it a dimensionless plot; however, the measured pressure drop could also be used. Pressure drop was measured between 0.3 m and 0.9 m of the test section. $K_1$ values were obtained for five different mass flow rates of wheat including the maximum and minimum possible mass flow rate for wheat in an air seeder. It should be mentioned that for every conveyed product, the relationship between $K_1$ and specific pressure drop must be developed by considering the highest and lowest possible mass flow rate of that product and points in-between.

The relationship between $K_1$ and specific pressure drop with an R-square value of 0.9918 and at air velocity 20 m/s was found to be $$K_1 = 2.429 \log \alpha + 0.4228. \quad [10]$$

The values of 2.429 and 0.4228 in Equation [10] will each vary with operational specifics, such as air velocity, particle type, pipeline characteristics, etc. Dependent on the operation setup, these values can be, e.g., stored in a lookup table and used by controller 54 for the calculation of $K_1$. Regardless of the particular mathematical equation used, the pressure drop (either measured or specific pressure drop) is used to calculate the value of $K_1$, which is then used to estimate the mass flow rate.

If the system uses Equation [10] for determination of $K_1$, once the operator selects wheat as the product and starts dispensing at a particular rate, the system will, e.g., first set the air velocity to 20 m/s and determine $K_1$. The operator can then operate at any velocity with that product flow rate. Every time the product flow rate is changed, the operator will experience a bit of waiting time for the system to reach 20 m/s and determine $K_1$. The mass flow ratio can then be calculated with Equation [8]. Attempts have been made to construct a continuous relationship between $K_1$, specific pressure drop and air velocity to eliminate the need for the system to reach a calibration velocity every time the mass flow rate of the product being applied is changed, but it was not possible to obtain a reliable continuous relationship.

Figure 5:
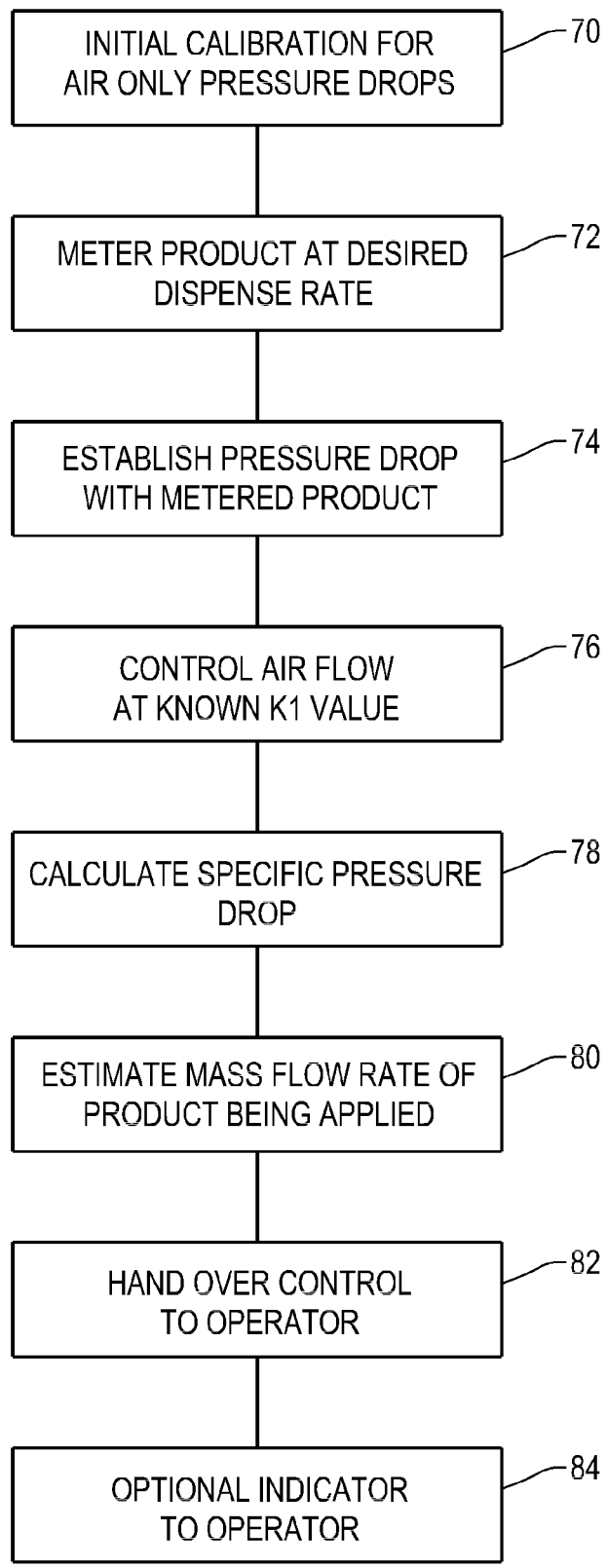

Referring now to FIG. 5, the mass flow rate of the product in the air seeder 10 for use with the model described above can be monitored using the following method:

Step 1: System records pressure drop over the entire range of velocity for air only once operator starts machine (block 70).

Step 2: Operator dispenses product at desired roller speed and air velocity and system records pressure drop (block 72 and 74).

Step 3: System controls air flow with an operating air velocity where the value of $K_1$ is correlated to a known specific pressure drop (block 76).

Step 4: Determine $K_1$ using Equation [10] and the calculated specific pressure drop at the operating air velocity (by dividing pressure drop due to the mixture by pressure drop due to air only (block 78).

Step 5: Estimate mass flow rate of product being applied using Equation [8] (block 80).

Step 6: System hands over control to the operator who can then operate at any desired air velocity at the substantially constant product application rate (block 82).

Step 7: Optionally, if the mass flow rate of the applied product varies outside of acceptable limits, then the system can provide an indication to the operator, such as an audible and/or visual alarm (block 84).

It may also be possible to use empirical data to determine the mass flow rate of the applied product. For example, the controller 54 may be configured to establish a relationship between the measured parameters (i.e., flow rate of the air flow, velocity of the air flow, and pressure drop through the air line) and the mass flow rate of product through the air line based on empirically derived parameters. For example, at least one empirical parameter may be associated with each product (e.g., seed, fertilizer, etc.), and the controller 54 may be configured to determine the mass flow rate of product through the air line 36 based on the pressure drop, the mass flow rate of the air flow, the velocity of the air flow, and the empirical parameters. The empirical parameters may be stored in a non-volatile memory 60 (FIG. 2), which includes a list of products and a corresponding list of empirical parameters. By way of example, prior to operation of the air seeder 10, an operator may select the type of product (e.g., seed, fertilizer, etc.) stored within the tank 24 of the air cart 12 via a user interface 58. The controller 54, in turn, may select the appropriate empirical parameters from the memory 60 based on the selected product. During operation of the air seeder 10, the controller 54 may determine the mass flow rate of product to the implement 14 based on the pressure drop, the flow rate of the air flow, the velocity of the air flow, and the empirical parameters associated with the product flowing to the ground engaging tools of the implement 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of monitoring a mass flow rate of product being applied with an agricultural implement, comprising the steps of:

providing an air flow from a pressure source at a known air flow rate in an air line;

determining a pressure drop in the air line along a known distance in a downstream direction using at least one pressure sensor, each said pressure sensor being positioned downstream from the pressure source;

repeating the providing and determining steps at a plurality of known air flow rates;

metering a product at a desired application rate into the air line at a selected one of the air flow rates;

establishing a pressure drop across the known distance at the selected air flow rate, while the product is being metered at the desired application rate;

calculating a value of $K_1$ dependent on the established pressure drop;

estimating a mass flow rate of the product being applied, using the mathematical expression: $\log \mu = -(1+\epsilon) \log Fr + K_1$ where $\mu$ (mass loading ratio)=ratio of pressure drop per unit length of air line for a solid-air mixture to pressure drop per unit length of air line for air only;

Fr (Froude number)=ratio of inertial force and gravitational force;

$\epsilon$=calibration variable; and $K_1$=constant for a given product being applied at a given mass flow rate; and verifying that the product is being metered into the air line at the desired application rate using the mass flow rate estimate.

2. The method of claim 1, wherein the establishing step includes the substeps of measuring a pressure drop across the known distance at the selected air flow rate while the product is being metered at the desired application rate, and calculating a specific pressure drop by dividing the measured pressure drop by the determined pressure drop, at the selected air flow rate.

3. The method of claim 1, wherein the calculating step is carried out using the mathematical expression:

$$K_1 = 2.429 \log \alpha + 0.4228$$

where:

$\alpha$ (specific pressure drop)=ratio of the pressure drop for solid-air mixture to pressure drop for air only.

4. The method of claim 1, wherein the calibration variable $\epsilon$ has a value of +/−0.1.

5. The method of claim 4, wherein the calibration variable $\epsilon$ has a value of 0.0419.

6. The method of claim 1, including the step of providing an indication to an operator if the estimated mass flow rate falls outside of acceptable limits.

7. The method of claim 1, wherein the metered product includes seed, fertilizer, herbicide or insecticide.

8. The method of claim 1, wherein the at least one sensor includes a first pressure sensor and a second pressure sensor which are spaced apart at the known distance, and the determining step includes determining a pressure drop in the air line between the first pressure sensor and the second pressure sensor, the first pressure sensor being downstream from the pressure source and the second pressure sensor being downstream from the first pressure sensor.

9. The method of claim 1, wherein the providing step is carried out using an air flow sensor in the air line to determine the known air flow rate.

10. The method of claim 1, wherein the air flow sensor is positioned between the pressure source and the at least one pressure sensor.

11. The method of claim 1, wherein the known air flow rate includes at least one of a volumetric flow rate and a velocity of the air flow.

12. The method of claim 1, wherein the agricultural implement is an air seeder.

13. A mass flow measurement system for monitoring a mass flow rate of product being applied with an agricultural implement, said mass flow measurement system comprising:
a pressure source in communication with an air line;
an air flow sensor in communication with the air line, said air flow sensor being positioned downstream from the pressure source;
a metering device in communication with the air line, said metering device being positioned downstream from the air flow sensor;
at least one pressure sensor in communication with the air line, each said pressure sensor being positioned downstream from the metering device;
a controller coupled with each of the pressure source, the air flow sensor, the metering device, and the at least one pressure sensor, the controller being configured for:
providing an air flow from a pressure source at a known air flow rate in an air line;
determining a pressure drop in the air line along a known distance in a downstream direction using at least one pressure sensor, each said pressure sensor being positioned downstream from the pressure source;
repeating the providing and determining steps at a plurality of known air flow rates;
metering a product at a desired application rate into the air line at a selected one of the air flow rates;
establishing a pressure drop across the known distance at the selected air flow rate, while the product is being metered at the desired application rate;
calculating a value of $K_1$ dependent on the established pressure drop;

estimating a mass flow rate of the product being applied, using the mathematical expression: $\log \mu = -(1+\Sigma) \log Fr + K_1$ where μ (mass loading ratio)=ratio of pressure drop per unit length of air line for a solid-air mixture to pressure drop per unit length of air line for air only;

Fr (Froude number)=ratio of inertial force and gravitational force;

ϵ=calibration variable; and $K_1$=constant for a given product being applied at a given mass flow rate;

and verifying that the product is being metered into the air line at the desired application rate using the mass flow rate estimate.

14. The mass flow measurement system of claim 13, wherein the establishing step includes the substeps of measuring a pressure drop across the known distance at the selected air flow rate while the product is being metered at the desired application rate, and calculating a specific pressure drop by dividing the measured pressure drop by the determined pressure drop, at the selected air flow rate.

15. The mass flow measurement system of claim 13, wherein the calculating step is carried out using the mathematical expression:

$$K_1 = 2.429 \log \alpha + 0.4228$$

where:

α (specific pressure drop)=ratio of the pressure drop for solid-air mixture to pressure drop for air only.

16. The mass flow measurement system of claim 13, wherein the calibration variable ϵ has a value of +/−0.1.

17. The mass flow measurement system of claim 16, wherein the calibration variable ϵ has a value of 0.0419.

18. The mass flow measurement system of claim 13, including the step of providing an indication to an operator if the estimated mass flow rate falls outside of acceptable limits.

19. The mass flow measurement system of claim 13, wherein the at least one sensor includes a first pressure sensor and a second pressure sensor which are spaced apart at the known distance, and the determining step includes determining a pressure drop in the air line between the first pressure sensor and the second pressure sensor, the first pressure sensor being downstream from the pressure source and the second pressure sensor being downstream from the first pressure sensor.

20. The mass flow measurement system of claim 13, wherein the known air flow rate includes at least one of a volumetric flow rate and a velocity of the air flow.

* * * * *